United States Patent
Khodykin et al.

(10) Patent No.: US 12,538,408 B2
(45) Date of Patent: Jan. 27, 2026

(54) LASER-SUSTAINED PLASMA GENERATION IN SUPERSONIC GAS JETS

(71) Applicant: KLA Corporation, Milpitas, CA (US)

(72) Inventors: Oleg Khodykin, Santa Cruz, CA (US); Boris Korneev, Milpitas, CA (US); Ilya Bezel, Mountain View, CA (US); Andrey Zakirov, Milpitas, CA (US); Andrey Evgenievich Stepanov, Moscow (RU); Vitaliy Rerikh, Milpitas, CA (US); Leonid Borisovich Zvedenuk, Moscow (RU)

(73) Assignee: KLA Corporation, Milpitas, CA (US)

( * ) Notice: Subject to any disclaimer, the term of this patent is extended or adjusted under 35 U.S.C. 154(b) by 11 days.

(21) Appl. No.: 18/759,284

(22) Filed: Jun. 28, 2024

(65) Prior Publication Data
US 2025/0016905 A1 Jan. 9, 2025

Related U.S. Application Data

(60) Provisional application No. 63/524,866, filed on Jul. 4, 2023.

(51) Int. Cl.
*H05H 1/24* (2006.01)
*H01J 37/32* (2006.01)
(Continued)

(52) U.S. Cl.
CPC ..... *H05H 1/2475* (2013.01); *H01J 37/32339* (2013.01); *H01J 37/3244* (2013.01); *H05H 1/0025* (2013.01); *H05H 1/46* (2013.01)

(58) Field of Classification Search
CPC ...... H05H 1/2475; H05H 1/0025; H05H 1/46; H01J 37/32339; H01J 37/3244
See application file for complete search history.

(56) References Cited

U.S. PATENT DOCUMENTS

| 4,179,599 A | 12/1979 | Conrad |
| 5,608,526 A | 3/1997 | Piwonka-Corle et al. |

(Continued)

FOREIGN PATENT DOCUMENTS

| JP | 2011054402 A | 3/2011 |
| JP | 2011054403 A | 3/2011 |
| WO | WO-2025183723 A2 * | 9/2025 |

OTHER PUBLICATIONS

Chylek et al., "Pressure dependence of the laser-induced breakdown thresholds of gases and droplets," Applied Optics, vol. 29, No. 15, May 20, 1990, 4 pages.
(Continued)

*Primary Examiner* — Adam D Houston
(74) *Attorney, Agent, or Firm* — Suiter Swantz IP

(57) ABSTRACT

A LSP broadband light source is disclosed. The light source may include a gas containment structure. The light source may include multiple jet nozzles, wherein the jet nozzles are configured to generate supersonic gas jets and direct the supersonic gas jets to collide within the gas containment structure to form a localized high-pressure region at the collision point. The light source may include a primary laser pump source, wherein the primary laser pump source is configured to direct a primary pump beam to a localized high-pressure region formed at the collision point. The light source may include a pulsed-assisting laser source, wherein the pulsed-assisting laser source is configured to direct a pulsed-assisting beam to the localized high-pressure region at the collision point. The light source may include a light collector element configured to collect broadband light emitted from the plasma.

21 Claims, 11 Drawing Sheets

(51) Int. Cl.
  *H05H 1/00* (2006.01)
  *H05H 1/46* (2006.01)

(56) References Cited

U.S. PATENT DOCUMENTS

| | | | |
|---|---|---|---|
| 5,999,310 A | 12/1999 | Shafer et al. | |
| 6,297,880 B1 | 10/2001 | Rosencwaig et al. | |
| 6,998,785 B1 * | 2/2006 | Silfvast | H05G 2/002 |
| | | | 118/723 MP |
| 7,435,982 B2 | 10/2008 | Smith | |
| 7,525,649 B1 | 4/2009 | Leong et al. | |
| 7,786,455 B2 | 8/2010 | Smith | |
| 7,957,066 B2 | 6/2011 | Armstrong et al. | |
| 7,989,786 B2 | 8/2011 | Smith et al. | |
| 8,182,127 B2 | 5/2012 | Yasuda et al. | |
| 8,309,943 B2 | 11/2012 | Smith et al. | |
| 8,525,138 B2 | 9/2013 | Smith et al. | |
| 8,921,814 B2 | 12/2014 | Pellemans et al. | |
| 9,099,292 B1 * | 8/2015 | Bezel | H01J 1/025 |
| 9,263,238 B2 | 2/2016 | Wilson et al. | |
| 9,318,311 B2 | 4/2016 | Chimmalgi et al. | |
| 9,390,902 B2 | 7/2016 | Bezel et al. | |
| 9,497,843 B1 | 11/2016 | Kaganovich et al. | |
| 9,516,733 B1 | 12/2016 | Bezel et al. | |
| 9,526,158 B1 | 12/2016 | Bezel et al. | |
| 9,721,761 B2 | 8/2017 | Wilson et al. | |
| 9,775,226 B1 * | 9/2017 | Bezel | H01J 65/04 |
| 10,690,589 B2 * | 6/2020 | Bezel | H01J 65/042 |
| 10,806,016 B2 | 10/2020 | Khodykin et al. | |
| 11,450,521 B2 * | 9/2022 | Shchemelinin | H01J 61/52 |
| 11,690,162 B2 * | 6/2023 | Bezel | H05H 1/46 |
| | | | 315/111.21 |
| 11,776,804 B2 * | 10/2023 | Bezel | H05H 1/24 |
| | | | 315/111.21 |
| 11,978,620 B2 * | 5/2024 | Bezel | H01J 65/04 |
| 12,033,845 B2 * | 7/2024 | Szilagyi | H01J 65/042 |
| 12,172,444 B2 * | 12/2024 | Wright | B41J 2/14 |
| 2007/0002465 A1 | 1/2007 | Chuang et al. | |
| 2012/0146511 A1 * | 6/2012 | Kuwabara | H05G 2/0092 |
| | | | 315/111.71 |
| 2012/0228525 A1 * | 9/2012 | Moriya | H05G 2/0027 |
| | | | 250/504 R |
| 2013/0114085 A1 | 5/2013 | Wang et al. | |
| 2016/0066402 A1 * | 3/2016 | Bezel | H01J 65/04 |
| | | | 250/432 R |
| 2016/0268120 A1 * | 9/2016 | Bezel | H01J 65/04 |
| 2016/0345420 A1 | 11/2016 | Kaganovich et al. | |
| 2017/0345639 A1 * | 11/2017 | Bezel | H01J 61/36 |
| 2019/0033204 A1 * | 1/2019 | Bezel | H01J 65/042 |
| 2021/0120659 A1 | 4/2021 | Szilagyi et al. | |
| 2021/0242009 A1 * | 8/2021 | Shchemelinin | H01J 61/28 |
| 2023/0335389 A1 * | 10/2023 | Szilagyi | H01J 61/025 |
| 2024/0105440 A1 * | 3/2024 | Bezel | H01S 3/094026 |
| 2025/0016905 A1 * | 1/2025 | Khodykin | H01J 37/32339 |

OTHER PUBLICATIONS

Raizer, "Gas Discharge Physics," Optical Plasmatron from Gas Discharge Physics, Springer, New York (1991), 11 pages.
Korean Intellectual Property Office, International Search Report and Written Opinion received in International Application No. PCT/US2024/036466, Sep. 29, 2025, 8 pages.

* cited by examiner

LASER-SUSTAINED PLASMA GENERATION IN SUPERSONIC GAS JETS

CROSS-REFERENCE TO RELATED APPLICATION

The present application claims priority to U.S. Provisional Application Ser. No. 63/524,866, filed Jul. 4, 2023, which is incorporated herein by reference in the entirety.

TECHNICAL FIELD

The present disclosure generally relates to plasma-based radiation sources, and, more particularly, to laser sustained plasma (LSP) broadband light sources including a plasma that is generated in a localized high-pressure region generated by one or more supersonic gas jets.

BACKGROUND

As the demand for integrated circuits having ever-smaller device features continues to increase, the need for improved illumination sources used for inspection of these ever-shrinking devices continues to grow. One such illumination source includes a laser-sustained plasma (LSP) light source. LSP light sources are capable of producing high-power broadband light. LSP light sources typically operate by focusing laser radiation into a gas volume in order to excite the gas, such as argon or xenon, into a plasma state, which is capable of emitting light. This effect is typically referred to as "pumping" the plasma. LSP used in broadband plasma (BBP) light sources is limited in brightness. Multiple methods have been suggested to increase such brightness. LSP based light source solutions in stagnant lamps have been shown to have a limited radiance as a result of the plasma tending to grow in the direction toward the pump laser absorbing the laser light. As the pump laser power increases, the plasma grows larger and the absorption in the plasma periphery becomes so significant that the power reaching the plasma focus starts to diminish and the LSP becomes dimmer. Gas flow-through solutions with laminar subsonic gas flow require recirculation of large volumes of high-pressure gas which becomes technically challenging. Typical values for such systems require recirculation of a good fraction of a kilogram of gas per second under over 100 bar pressure. This arrangement also requires a transparent high-pressure vessel or a chamber with high-pressure windows for light input-output, all of which add to construction complexity and safety of operation. Liquid jet-based systems require cryogenic cooling to liquify gases with high-pressure inside to create sufficiently fast liquid jets. At the speeds required, liquid jets tend to become unstable breaking into spray, and LSP may become noisy. Therefore, there is a desire to provide an LSP source that cures the deficiencies associated with prior approaches.

SUMMARY

A laser-sustained plasma (LSP) broadband light source is disclosed, in accordance with one or more embodiments of the present disclosure. In illustrative embodiments, the light source includes a gas containment structure. In illustrative embodiments, the light source includes a plurality of jet nozzles, wherein the plurality of jet nozzles are configured to generate a plurality of supersonic gas jets and direct the plurality of supersonic gas jets to collide within the gas containment structure to form a localized high-pressure region at the collision point of the plurality of supersonic gas jets. In illustrative embodiments, the light source includes a primary laser pump source, wherein the primary laser pump source is configured to direct a primary pump beam to a localized high-pressure region formed at a collision point of the plurality of supersonic gas jets. In illustrative embodiments, the light source includes a pulsed-assisting laser source, wherein the pulsed-assisting laser source is configured to direct a pulsed-assisting beam to the localized high-pressure region at the collision point of the plurality of supersonic gas jets, wherein the primary beam and the pulsed-assisting beam are configured to sustain a plasma within the localized high-pressure region. In illustrative embodiments, the light source includes a light collector element configured to collect at least a portion of broadband light emitted from the plasma. In illustrative embodiments, the LSP broadband light source may be implemented within an optical system such as, but not limited to, an inspection system, a metrology system, or a lithography system.

An LSP broadband light source is disclosed, in accordance with one or more additional and/or alternative embodiments of the present disclosure. In illustrative embodiments, the light source includes a gas containment structure. In illustrative embodiments, the light source includes one or more jet nozzles, wherein the one or more jet nozzles are configured to generate one or more supersonic gas jets. In illustrative embodiments, the light source includes a primary laser pump source, wherein the primary laser pump source is configured to direct a primary pump beam to a localized high-pressure region formed by a supersonic gas expansion of the one or more supersonic gas jets. In illustrative embodiments, the light source includes a pulsed-assisting laser source, wherein the pulsed-assisting laser source is configured to direct a pulsed-assisting beam to the localized high-pressure region formed by the supersonic gas expansion of the one or more supersonic gas jets, wherein the primary beam and the pulsed-assisting beam are configured to sustain a plasma within the localized high-pressure region. In illustrative embodiments, the light source includes a light collector element configured to collect at least a portion of broadband light emitted from the plasma.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Figure 1A:
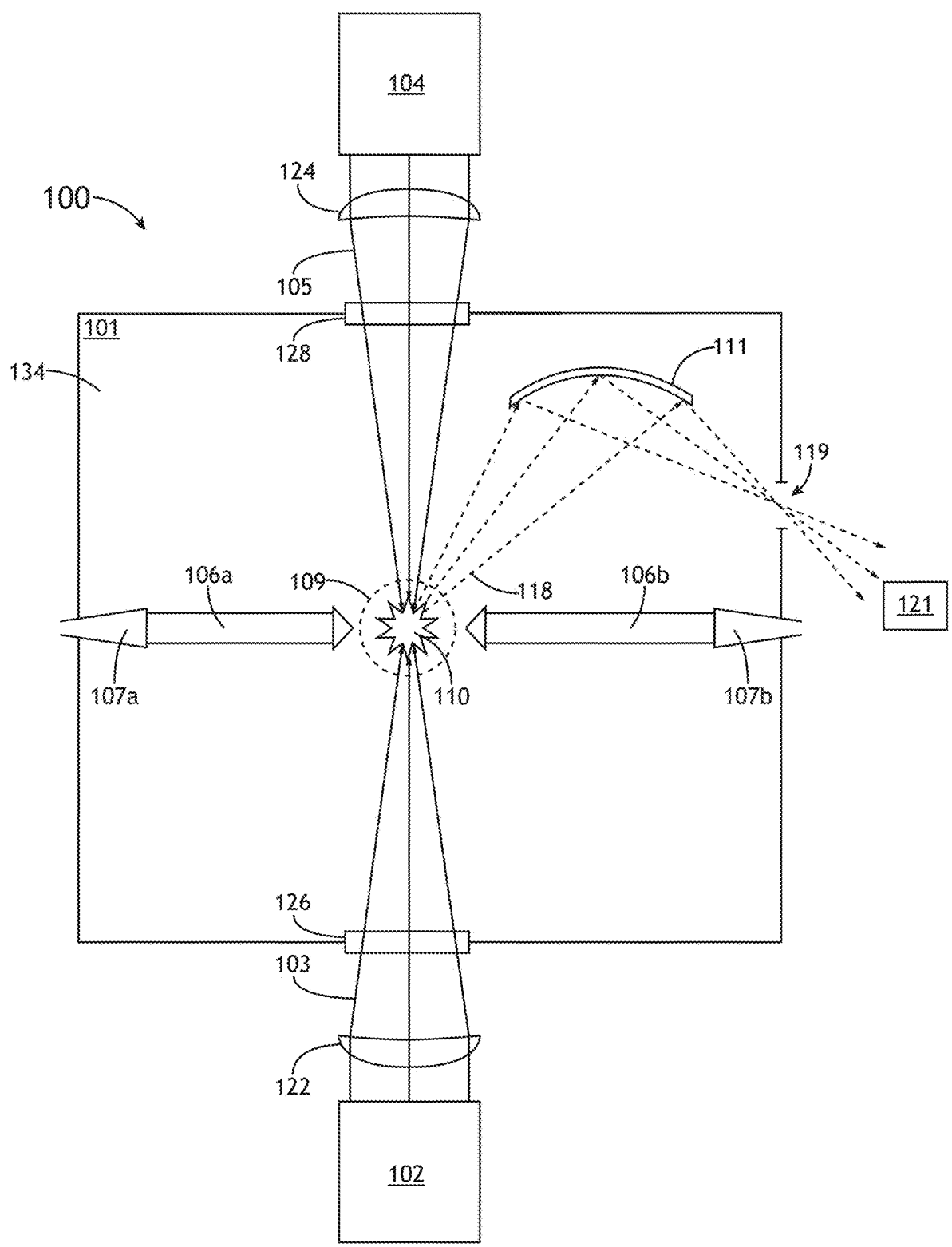
FIGS. 1A-1B illustrate a conceptual view of a LSP broadband light source with multiple colliding supersonic jets for forming a localized high-pressure gas region for plasma generation, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1A-4B, a broadband light source including a laser-sustained plasma is described, in accordance with one or more embodiments of the present disclosure.

Embodiments of the present disclosure are direct to the formation of a localized high-pressure gas region located near a laser focal spot of a primary pump laser and/or pulse-assisting laser to sustain a plasma at that location. The high-pressure region may be formed at a Mach disk in a supersonic gas expansion of one or more supersonic jets or at a colliding point of two or more supersonic gas jets. The one or more supersonic gas jets may be formed with one or more nozzles (e.g., convergent-divergent nozzle, convergent nozzle, or cylindrical nozzle). Since the high-pressure region is small, a pump laser beam can propagate through a surrounding low-pressure/ambient region gas region within the gas containment structure and to the high-pressure region without significant absorption. Due to the lack of absorption in the low-pressure region, the laser beam is efficiently delivered to the high-pressure region, where it is efficiently absorbed by the high-pressure plasma. The region of strong absorption is not dependent on the laser power. Therefore, as the laser power increases, so does density of absorbed energy in the small high-pressure region, which, in turn, generates a more radiant (brighter) plasma.

The implementation of a localized high-pressure region allows for the increase in spectral radiance (brightness) than can be achieved in stagnant high-pressure sources. LSP brightness in stagnant high-pressure sources is limited by absorption in the plasma periphery. As the pump power increases, the plasma periphery grows and absorption in the periphery limits how much power can be delivered to the laser focus. In the proposed solution, plasma periphery also grows, however, absorption of the periphery is low, because it is located in an ambient low-pressure region. This allows all pump laser radiation to be delivered to the high-pressure region formed the supersonic jet(s).

In comparison to high-pressure flow-through solutions, embodiments of the present disclosure do not require a high-pressure plasma containing gas vessel, the construction of which is a major challenge in high-power UV-VUV LSP sources. Embodiments of the present disclosure require only relatively low-pressure (e.g., up to about 10 bar) or even an atmospheric enclosure. Unlike liquid jets used with a CW pump source, the supersonic gas jet solution of the present disclosure removes restrictions associated with cryogenic jet operation, liquid jet instabilities, and liquid jet breakdown due to interaction with the ambient gas and shockwaves from gas outflow in the interaction region.

Unlike pulsed operation, the present solution operates in the CW regime, which is beneficial for optical metrology and inspection applications requiring high-brightness sources. CW operation significantly reduces optical damage in such systems.

Figure 1B:
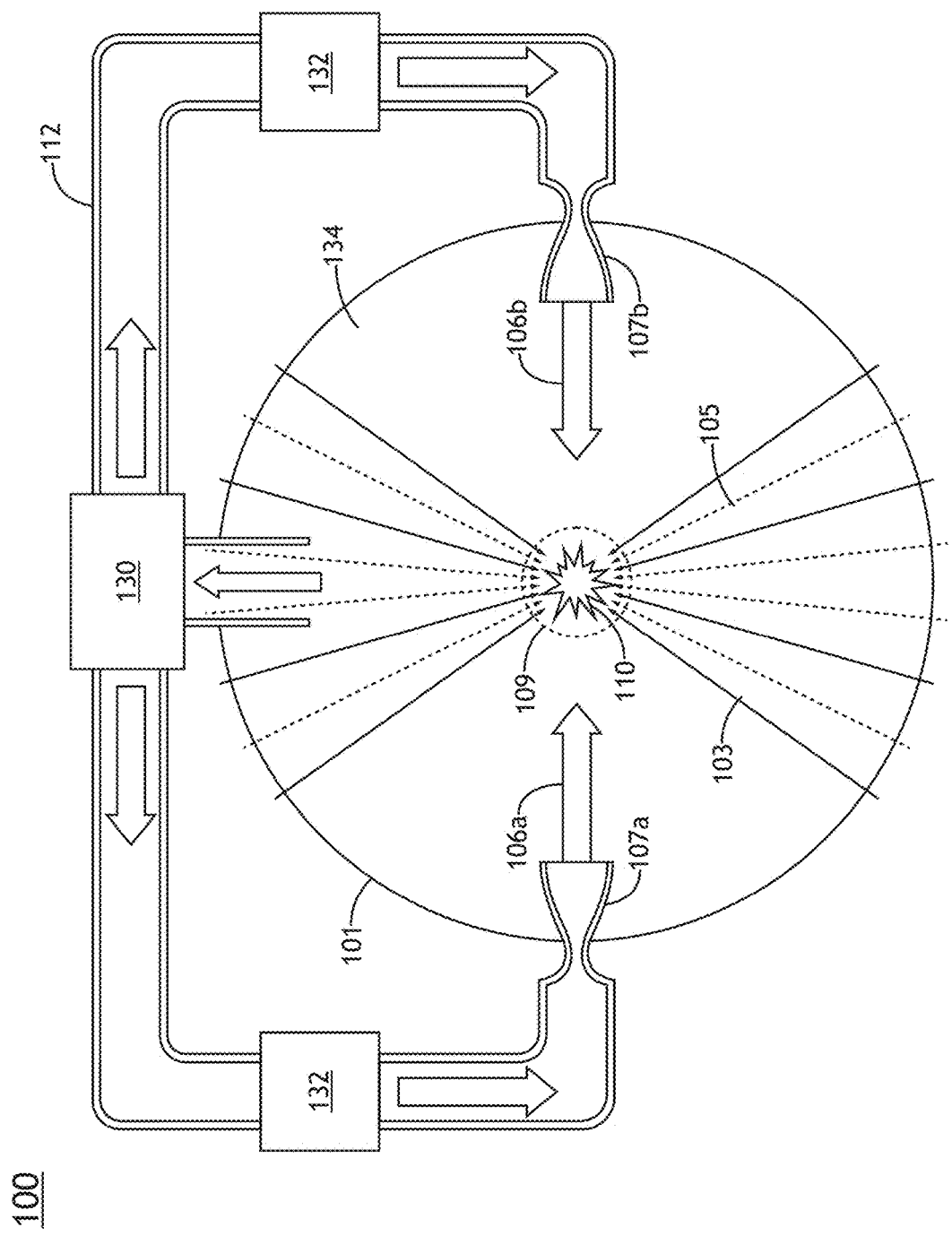

FIGS. 1A-1B illustrate the broadband LSP light source 100, in accordance with one or more embodiments of the present disclosure.

In embodiments, the light source 100 includes a gas containment structure 101, a primary laser pump source 102, a pulsed-assisting laser source 104, two or more jet nozzles 107a, 107b, and a light collector element 111. In additional and/or alternative embodiments, as shown in FIG. 1B, the broadband LSP light source 100 includes a recirculation loop 112.

The two or more jet nozzles 107a, 107b may include a first jet nozzle 107a and a second jet nozzle 107b (or any number of nozzles). In embodiments, the two or more jet nozzles 107a, 107b may include two or more high-pressure (e.g., above 50 bar) nozzles configured to generate two or more supersonic gas jets 106a, 106b. The two or more jet nozzles 107a, 107b may be configured to direct the two or more supersonic gas jets 106a, 106b to collide with each other within the gas containment structure 101 to form a localized high-pressure region 109. The localized high-pressure region 109 is measured to a surrounding ambient pressure region 134 and is greater than the ambient pressure. For example, the ambient pressure may be 1 bar with the localized high-pressure region 109 being at a pressure between 10-100 bar. It is noted that the ambient pressure (e.g., about 1 bar) is less than the pressure of the nozzles 107a, 107b and the temperature of the nozzles 107a, 107b is sufficient to avoid liquification of the gas at expulsion from the nozzles 107a, 107b.

It is recognized that the light source 100 may implemented with any number and type of gas components. In embodiments, the gas used to generate the supersonic jets(s) of the present disclosure may include one or more noble gases. For example, the one or more noble gases may include, but are not limited to, xenon, argon, neon, or helium. By way of another example, the gas may include one or more non-noble gases. In embodiments, the gas may include a mixture of two or more gases. For example, the gas may include a mixture of two or more noble gases (e.g., Ar/Xe). By way of another example, the gas may include a mixture of a noble gas with a non-noble gas or a mixture of two or more non-noble gases.

In embodiments, the primary laser pump source 102 is configured to direct a primary pump beam 103 to the localized high-pressure region 109 formed at the collision point of the two or more supersonic gas jets 106a, 106b. In embodiments, the pulsed-assisting laser source 104 is configured to direct a pulsed-assisting beam 105 to the localized high-pressure region 109 at the collision point of the two or more supersonic gas jets 106a, 106b. In this regard, the primary beam 103 and/or the pulsed-assisting beam 105 are configured to generate and sustain the plasma 110 within the localized high-pressure region 109.

The primary laser pump source 102 may include any laser pump source known in the art. In embodiments, the primary laser pump source 102 may include one or more continuous-wave (CW) lasers. For example, the primary laser pump source 102 may include, but is not limited to, one or more fiber-based near-infrared (NIR) lasers, one or more direct photodiode lasers, and/or one or more $CO_2$ lasers. It is noted that the primary laser pump source 102 is not limited to a single laser. For example, the primary pump source 102 may include any number of additional laser sources. For instance, the primary pump source 102 may include a first primary pump source emitting a first wavelength and at least a second primary pump source emitting a second wavelength, and so on.

The pulsed-assisting laser source 104 may include any pulsed laser source known in the art. In embodiments, the pulsed-assisting laser source 104 may include one or more picosecond or femtosecond pulsed laser sources. For example, the one or more pulsed-assisting laser sources 104 may operate at a repetition rate greater than about 50 kHz (e.g., greater than 100 kHz). For example, one or more pulsed-assisting laser sources 104 may operate at a repetition rate greater than 1 MHz. The pulsed-assisting laser source 104 may include, but is not limited to, one or more pulsed fiber-based NIR lasers, one or more pulsed coherently coupled fiber lasers, and/or one or more pulsed think disk lasers. It is noted that the primary laser pump source 102 is not limited to a single laser. For example, the pulsed-assisting laser source 104 may include any number of additional laser sources. For instance, the pulsed-assisting laser source 104 may include a first pulsed-assisting laser source emitting a first wavelength and at least a second pulsed-assisting laser source emitting a second wavelength, and so on.

It is noted that the scope of the present disclosure is not limited to the use of both a primary pump source 102 and a pulsed-assisting source 104. In additional and/or alternative embodiment, the source 100 may sustain the plasma 110 at the localized high-pressure region 109 with only one or more primary pump sources 102. In additional and/or alternative embodiment, the source 100 may sustain the plasma 110 at the localized high-pressure region 109 with only one or more pulsed-assisting sources 104.

In embodiments, light source 100 includes one or more focusing optics 122 for focusing/directing the primary pump beam 103 to the plasma 110. In addition, light source 100 may include one or more focusing optics 124 for focusing/directing the pulsed-assisting beam 105 to the plasma 110. It is noted herein that the pump laser focusing optics 122 and the pulsed-assisting laser optics 124 may include any optical element known in the art for directing and/or focusing radiation including, but not limited to, a lens, a mirror, a prism, a polarizer, a grating, a filter, or a beamsplitter. In embodiments, the gas containment structure 101 may include one or more transparent portions. For example, the gas containment structure 101 may include, but is not limited to, input windows 126, 128 to accommodate the primary pump laser beam 103 and the pulsed-assisting beam 105. In addition, the gas containment structure 101 may include an exit window (not shown). It is noted, however, that since much of the gas within the containment structure may be held at relatively low pressure (e.g., ambient pressure of approximately 1 Bar) high-pressure windows are not a requirement for operation.

The implementation of a pulsed-assisting laser source in conjunction with a primary laser source is discussed in U.S. patent application Ser. No. 18/372,590, filed on Sep. 25, 2023, which is incorporated herein by reference in the entirety.

In embodiments, recirculation pump 130 recirculates gas through the gas containment structure 101. In this regard, the recirculation loop 112 may provide gas to the nozzles 107a, 107b to form supersonic jets 106a, 106b to form the localized high-pressure region 109 for generating/sustaining plasma 109. In turn, the recirculation loop 112 carries away hot gas from the plasma 110 and cools the gas via one or more heat exchangers 132. The cool gas may then be cycled back through the system and driven into the collision region 109 via nozzles 107a, 107b. The recirculation loop 112 may include, but is not limited to, one or more pumps 130, one or more heat exchangers 132, and/or one or more filters to drive the nozzles 107a, 107b.

In embodiments, the light collector element 111 is configured to collect broadband light 118 emitted from the plasma 110. The light collector element 111 may include any one or more optical elements known in the art configured to collect and/or focus broadband light 118 including, but not limited to, one or more mirrors, one or more prisms, one or more lenses, one or more diffractive optical elements, one or more parabolic mirrors, one or more elliptical mirrors, one or more spherical mirrors and the like. It is recognized herein that the light collector element 111 may be configured to collect and/or focus broadband light 118 generated by plasma 110 to be used for one or more downstream processes including, but not limited to, imaging processes, inspection processes, metrology processes, lithography processes, and the like. The broadband light 118 may be collected by the light collector element 111 and directed through one or more apertures 119 to one or more downstream applications 121.

Figure 2:
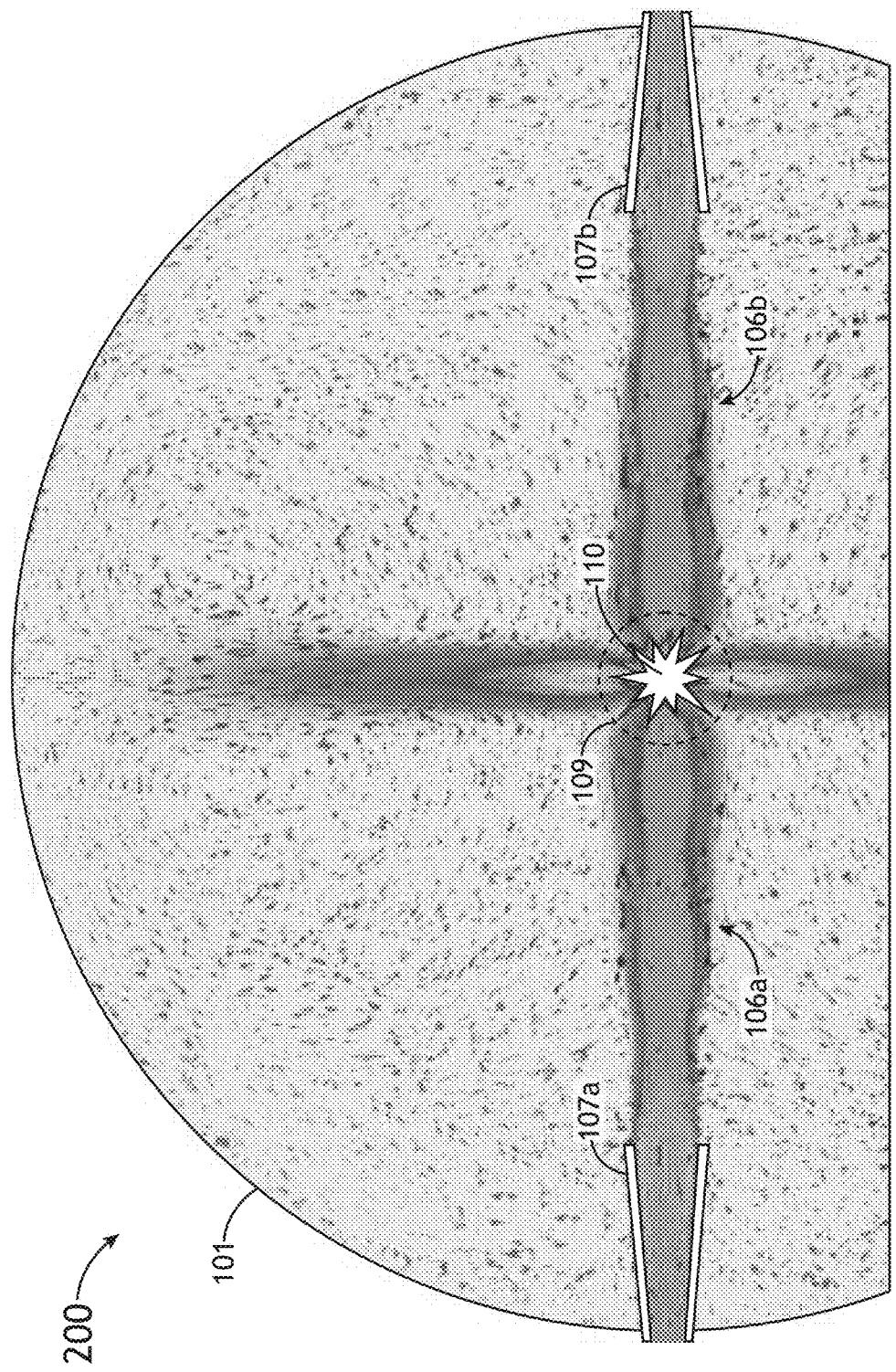
FIG. 2 illustrates the gas velocity of the gas flow within an LSP source and, in accordance with one or more embodiments of the present disclosure.
Figure 3:
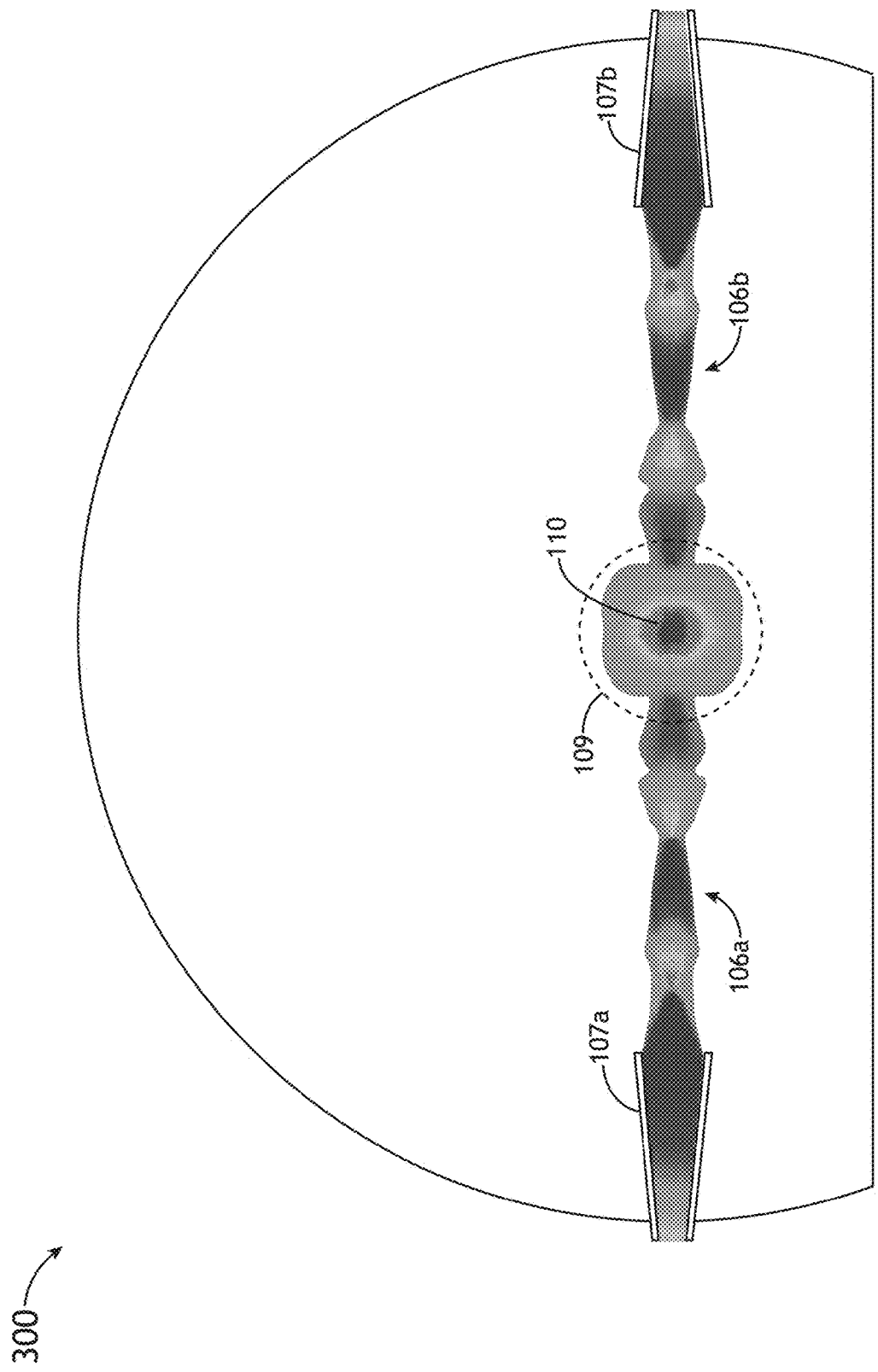
FIG. 3 illustrates the pressure of the gas within the gas containment structure, in accordance with one or more embodiments of the present disclosure.

FIGS. 2-3 illustrate simulated views 200, 300 of operation of the light source 100, in accordance with one or more embodiments of the present disclosure. FIG. 2 depicts the gas velocity of the gas flow within gas containment structure 100 and FIG. 3 depicts the pressure within the gas containment structure 100. Views 200 and 300 showing the simulated gas velocity and pressure indicate a high-pressure low-velocity region 109 of a few hundred microns formed by collision of two supersonic gas jets 106a, 106b. The simulation was performed with convergent-divergent nozzles with elongated and relatively shallow angles of divergence. Also, a localized pressure-to-ambient pressure ratio of approximately 10 inside the gas containment structure is adequate for operation of the source 100. The diamond shockwave structure that results when the pressure ratios on the nozzles are much higher than a critical pressure can be managed by designing the nozzle shape, the nozzle throat, length of the divergent section, and other parameters which are specific to the selected gas (e.g., selected noble gas) and any other requirements of the source 100.

In this example, it is noted that if the CW Pump laser intensity near the focus is higher than the gas breakdown threshold of about 109-1013 $W/cm^2$. In this case, the gas flow cannot blow it away and the plasma self-starts. To assist this process and to ensure stability of the plasma, even in presence of fast gas flow, a train of picosecond/femtosecond pulses with high repetition rates of about 1-1000 MHz may be utilized. This may be provided by a pulse-assisting laser 104 with lower average power, which exceeds the breakdown thresholds during each pulse, and pulses are close enough together so that the plasma does not have time to quench in between pulses. For example, a 20 KW CW pump laser can be combined with a 2 KW 100 MHz 300 ps pulse-assisting laser. Pressure dependence of breakdown thresholds in laser-induced plasma is discussed in Jon P. Davis, et. al., *Pressure dependence of the laser-induced breakdown thresholds of gases and droplets*, APPLIED OPTICS, Vol. 29, No. 15, p. 2303, which is incorporated herein by reference in the entirety.

It is noted that the various parameters of the light source 100 described in the non-limiting example should not be interpreted as limitations on the scope of the present disclosure. Rather, these examples are provided merely for illustration purposes and it should be understood that various laser powers, frequency, pulse durations, gas pressure, and gas velocity may be utilized given the particulars of the light source 100 in operation.

While much of the present disclosure has focused on the utilization of two or more colliding jets to generate a localized high-pressure zone, this configuration should not be interpreted as a limitation on the scope of the present disclosure. Rather, it is contemplated that any number of gas/fluid flow arrangements may be implemented to generate localized high-pressure gas regions (relative to an ambient pressure) suitable for plasma production.

Figure 4A:
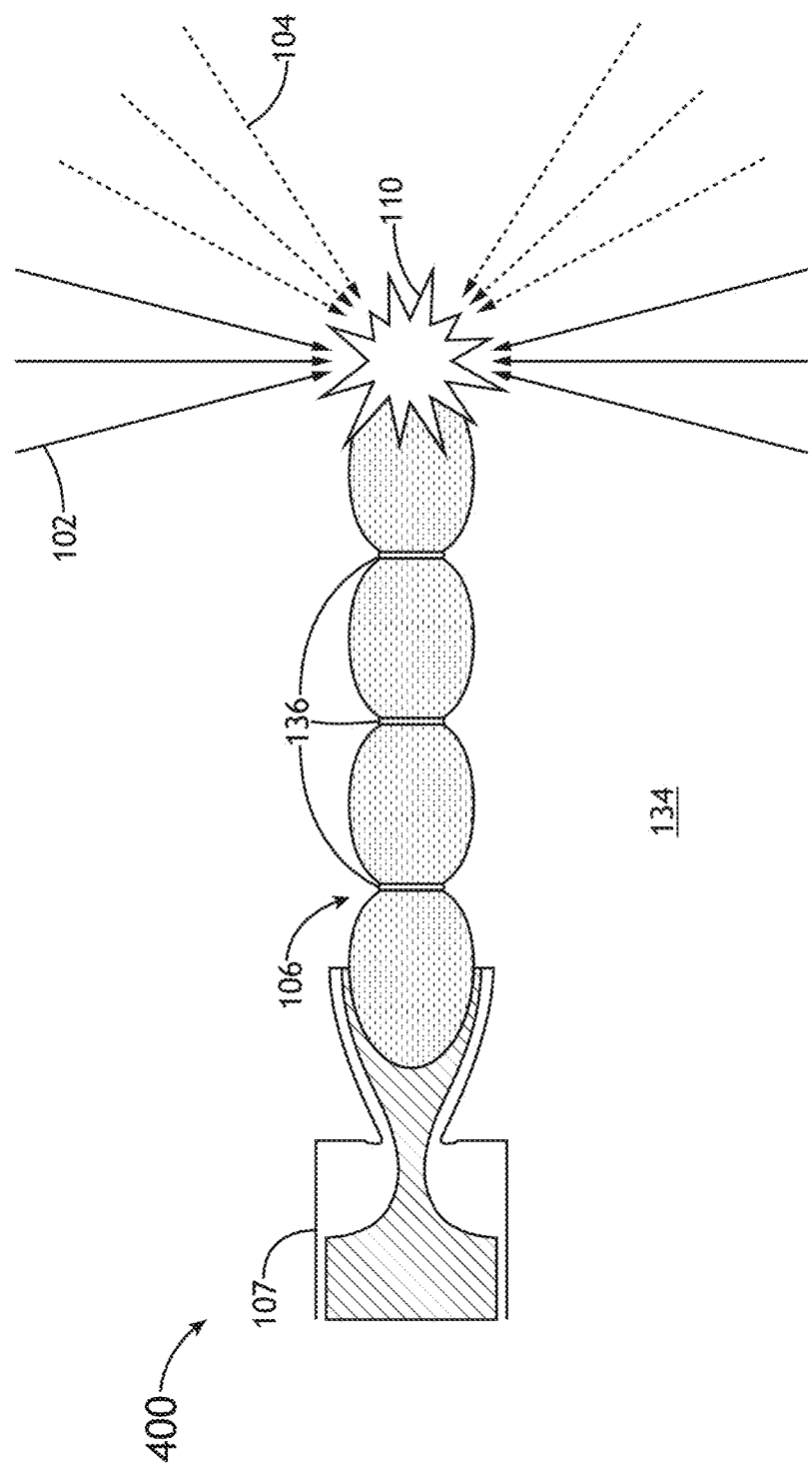
FIGS. 4A-4B illustrate conceptual views of a single nozzle used to generate a single supersonic jet, in accordance with one or more embodiments of the present disclosure.
Figure 4B:
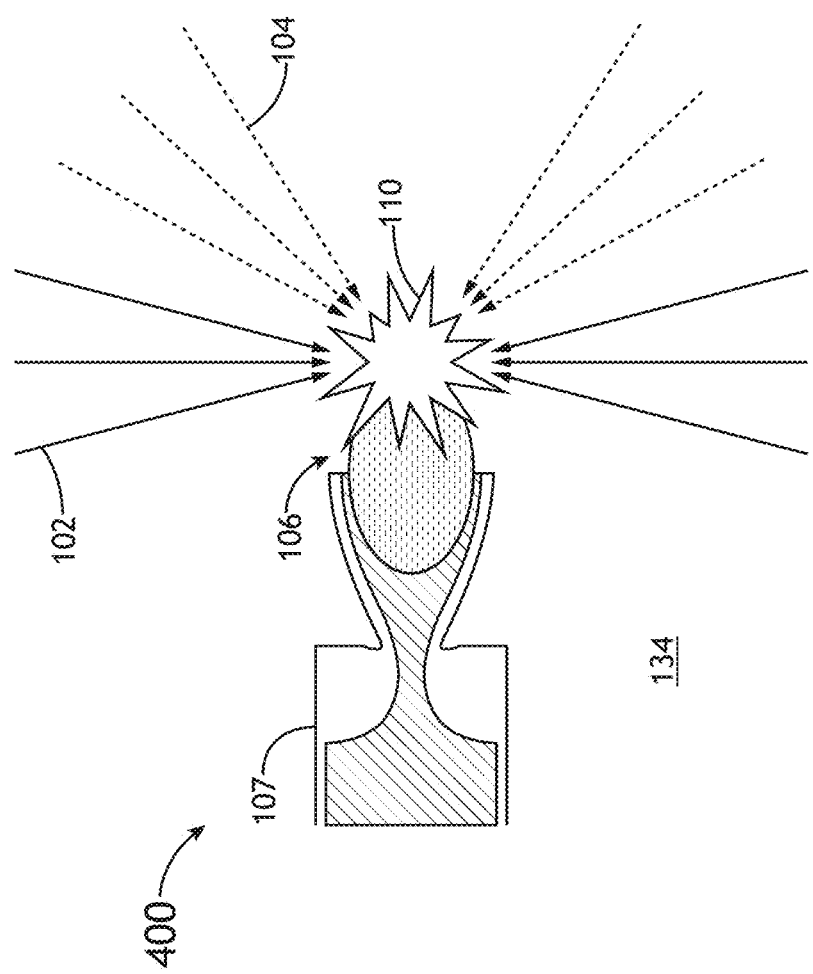

FIG. 4A illustrates a conceptual view 400 of a single nozzle 107 used to generate a single supersonic jet 106, in accordance with one or more embodiments of the present disclosure. In this embodiment, high pressure regions (e.g., relative to the lower pressure ambient gas) are formed within the supersonic gas stream. For example, Mach disks within shockwaves (e.g., diamond shockwaves) of the supersonic gas stream. The localized high-pressure region 109 may be formed using one or more Mach disks 136 of the supersonic gas stream. The plasma 110 may be generated and sustained at the localized high-pressure region 109 associated with the one or more Mach disks 136. As shown in FIG. 4B, the localized high-pressure region 109 may be formed at an exit of the supersonic jet nozzle 107. In this example, plasma 110 may be generated and sustained at the localized high-pressure region 109 formed at the exit of the supersonic jet nozzle 107.

Figure 5A:
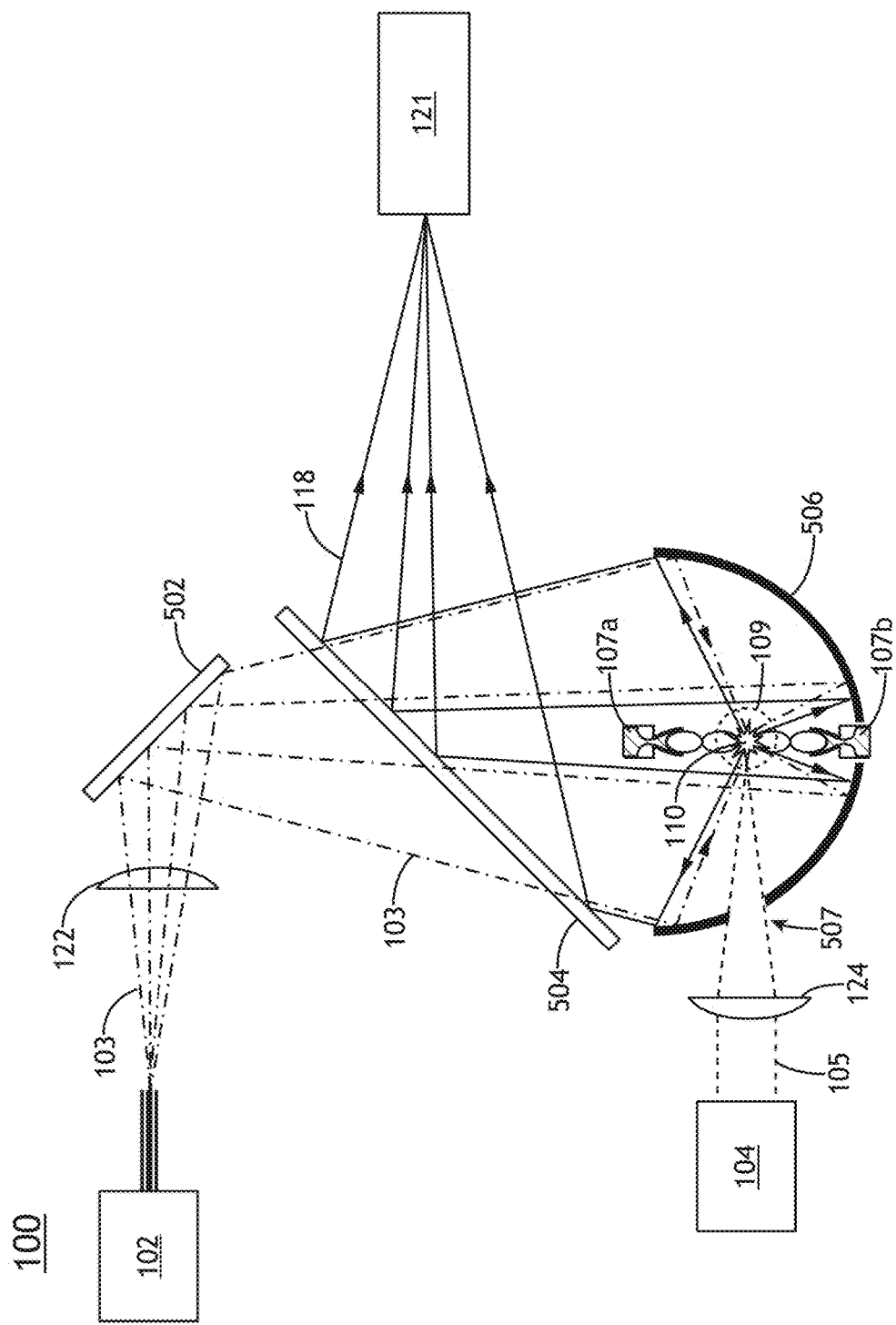
FIG. 5A illustrates a simplified schematic view of the LSP broadband light source where the optical path of the pump beam does not overlap with the optical path of the pulse-assisting beam, in accordance with one or more embodiments of the present disclosure.

FIG. 5A illustrates a simplified schematic diagram of the broadband LSP light source 100, in accordance with one or more embodiments of the present disclosure. It is noted herein that the various embodiments described with respect to FIGS. 1A-4B should be interpreted to extend to the embodiments of FIG. 5A. In this embodiment, the light collector element 506 is a curved mirror. For example, the light collector element 506 may include, but is not limited to, an elliptical, spherical, or parabolic mirror. In embodiments, the primary pump beam 103 and the pump-assisting beam 105 do not share an optical path prior to entry into the light collector element 506. For example, the primary pump source 102 may direct the pump beam 103 through beam shaping optics 122 and turning mirror 502. In turn, the pump beam 103 passes through the dichroic mirror 504 (e.g., cold mirror) and is directed toward the localized high-pressure region 109. In addition, the pulsed-assisting source 104 may be arranged so as to direct the pulsed-assisting beam 105 through one or more side ports 507 formed through the wall (e.g., sidewall) of the light collector element 506 and into the localized high-pressure region 109. In this example, the nozzles 107a, 107b are arranged in a top/bottom configuration with the collision point and localized high-pressure region 109 coinciding with the focus of the light collector element 506 (e.g., focus of an elliptical reflector). As described previously herein, pump beam 103 and pulsed-assisting beam 105 act to sustain the plasma 110. Broadband light 118 emitted by plasma 110 may then be collected by the light collector element 506 and directed by the dichroic mirror 504 to one or more downstream optical elements 121.

Figure 5B:
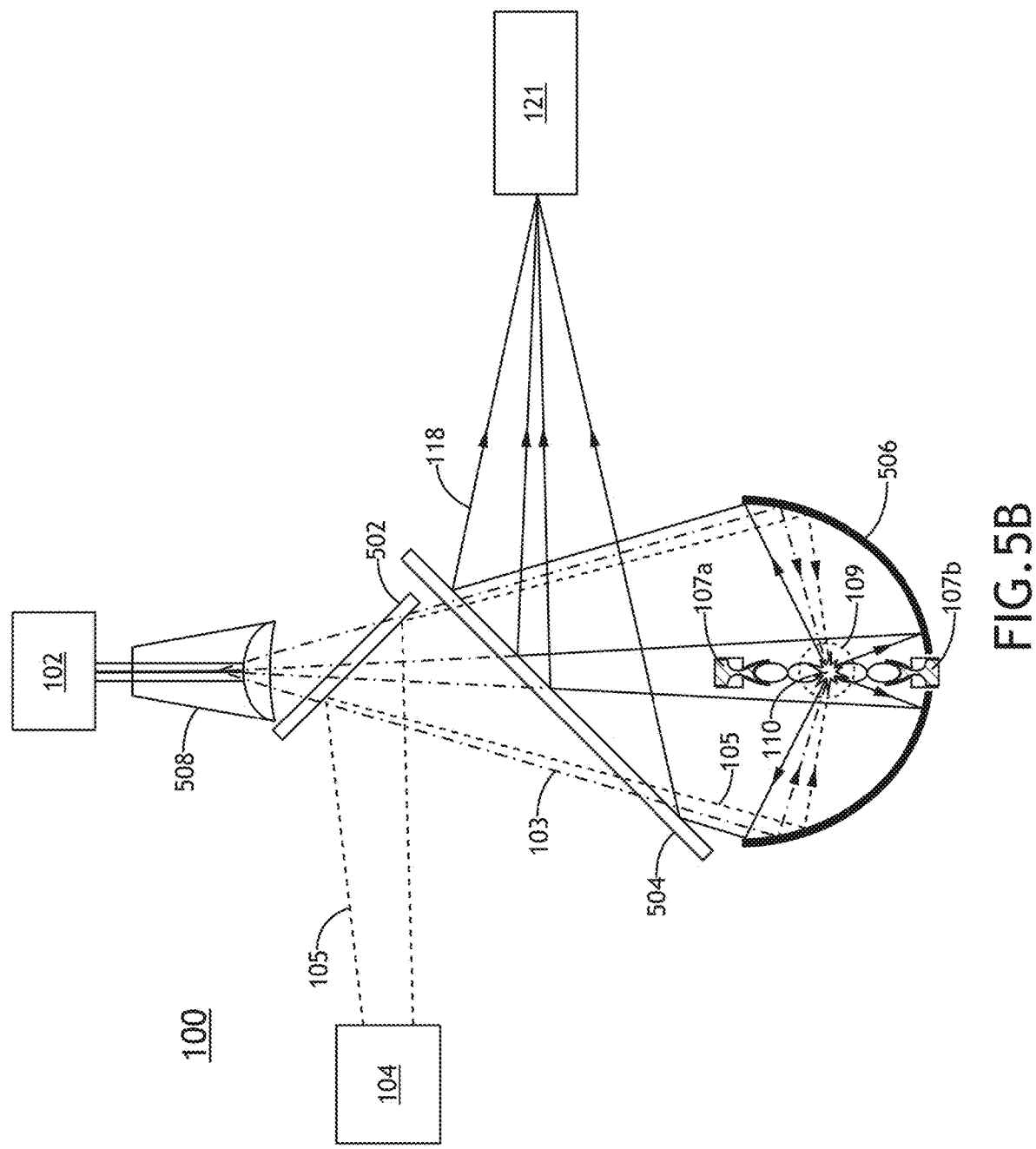
FIG. 5B illustrates a simplified schematic view of the LSP broadband light source where the optical path of the pump beam overlaps with the optical path of the pulse-assisting beam through the use of a dichroic mirror, in accordance with one or more embodiments of the present disclosure.

FIG. 5B illustrates a simplified schematic diagram of the broadband LSP light source 100, in accordance with one or more embodiments of the present disclosure. It is noted herein that the various embodiments described with respect to FIGS. 1A-5A should be interpreted to extend to the embodiments of FIG. 5B. In this embodiment, the primary pump beam 103 and the pump-assisting beam 105 share an optical path prior to entry into the light collector element 506 (e.g., elliptical, spherical, or parabolic mirror). For example, the primary pump source 102 may direct the pump beam 103 through pump module including one or more laser-shaping optics 508. In turn, the primary pump beam 103 passes through the dichroic mirror 504 (e.g., cold mirror) and is directed toward the localized high-pressure region 109. In addition, the pulsed-assisting source 104 may be arranged so as to direct the pulsed-assisting beam 105 to a first dichroic mirror 502. The first dichroic mirror 502 is configured to transmit the primary pump beam 103 toward the light collector element 506 while reflecting the pulsed-assisting beam 105 toward the light collector element 506. Following the first dichroic mirror 502, the primary pump beam 103 and the pulsed-assisting beam 105 share an optical path to the light collector element 506. The primary pump beam 103 and the pulsed-assisting beam 105 may then pass through the second dichroic mirror 504 and are reflected by the light collector element 506 into the localized high-pressure region 109. As described previously herein, pump beam 103 and pulsed-assisting beam 105 act to sustain the plasma 110. Broadband light 118 emitted by plasma 110 may then be collected by the light collection element 506 and directed by the dichroic mirror 504 to one or more downstream optical elements 121.

Figure 5C:
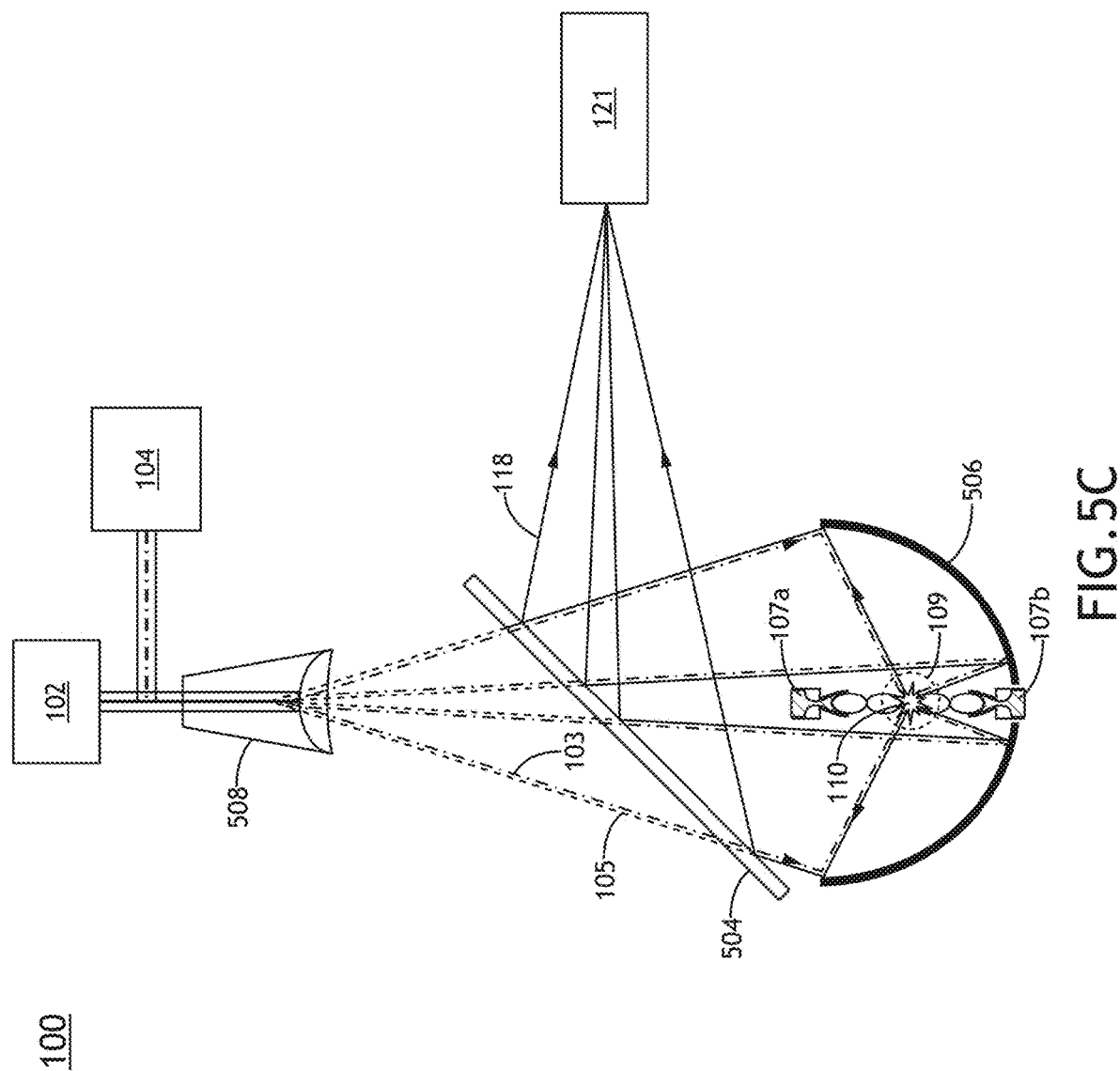
FIG. 5C illustrates a simplified schematic view of the LSP broadband light source where the pulse-assisting beam is injected into a laser fiber of the primary pump source, in accordance with one or more embodiments of the present disclosure.

FIG. 5C illustrates a simplified schematic diagram of the broadband LSP light source 100, in accordance with one or more embodiments of the present disclosure. It is noted herein that the various embodiments described with respect to FIGS. 1A-5B should be interpreted to extend to the embodiments of FIG. 5C. In this embodiment, pump-assisting beam 105 is injected into one or more laser fibers of the primary pump source 102 for the primary pump beam 103. As a result, the primary pump beam 103 and pump-assisting beam 105 share an optical path as the beams 103, 105 exit the beam-shaping optics 508. Upon exiting the beam-shaping optics 508, the primary pump beam 103 and the pulsed-assisting beam 105 are directed through the dichroic mirror 504 (e.g., cold mirror) toward the light collector element 506 which, in turn, directs the primary bump beam 103 and the pulsed-assisting beam 105, which share an optical path, to localized high-pressure region 109. As described previously herein, pump beam 103 and pulsed-assisting beam 105 act to sustain the plasma 110. Broadband light 118 emitted by plasma 110 may then be collected by the light collector element 506 and directed by the dichroic mirror 504 to one or more downstream optical elements 121.

It is noted that the nozzle arrangement depicted in FIG. 5A is not limited to a top/bottom arrangement or to two nozzles. It is contemplated that two or more nozzles (e.g., 2, 3, 4, 5, 6, and so on) may be arranged in any alignment geometry (e.g., side to side, radial, etc.). In addition, a single jet configuration may be implemented within the embodiment depicted in FIGS. 5A-5C.

The generation of a laser-sustained plasma is also generally described in U.S. Pat. No. 7,435,982, issued on Oct. 14, 2008, which is incorporated by reference herein in the entirety. The generation of plasma is also generally described in U.S. Pat. No. 7,786,455, issued on Aug. 31, 2010, which is incorporated by reference herein in the entirety. The generation of plasma is also generally described in U.S. Pat. No. 7,989,786, issued on Aug. 2, 2011, which is incorporated by reference herein in the entirety. The generation of plasma is also generally described in U.S. Pat. No. 8,182,127, issued on May 22, 2012, which is incorporated by reference herein in the entirety. The generation of plasma is also generally described in U.S. Pat. No. 8,309,943, issued on Nov. 13, 2012, which is incorporated by reference herein in the entirety. The generation of plasma is also generally described in U.S. Pat. No. 8,525,138, issued on Feb. 9, 2013, which is incorporated by reference herein in the entirety. The generation of plasma is also generally described in U.S. Pat. No. 8,921,814, issued on Dec. 30, 2014, which is incorporated by reference herein in the entirety. The generation of plasma is also generally described in U.S. Pat. No. 9,318,311, issued on Apr. 19, 2016, which is incorporated by reference herein in the entirety. The generation of plasma is also generally described in U.S. Pat. No. 9,390,902, issued on Jul. 12, 2016, which is incorporated by reference herein in the entirety. In a general sense, the various embodiments of the present disclosure should be interpreted to extend to any plasma-based light source known in the art.

Figure 6:
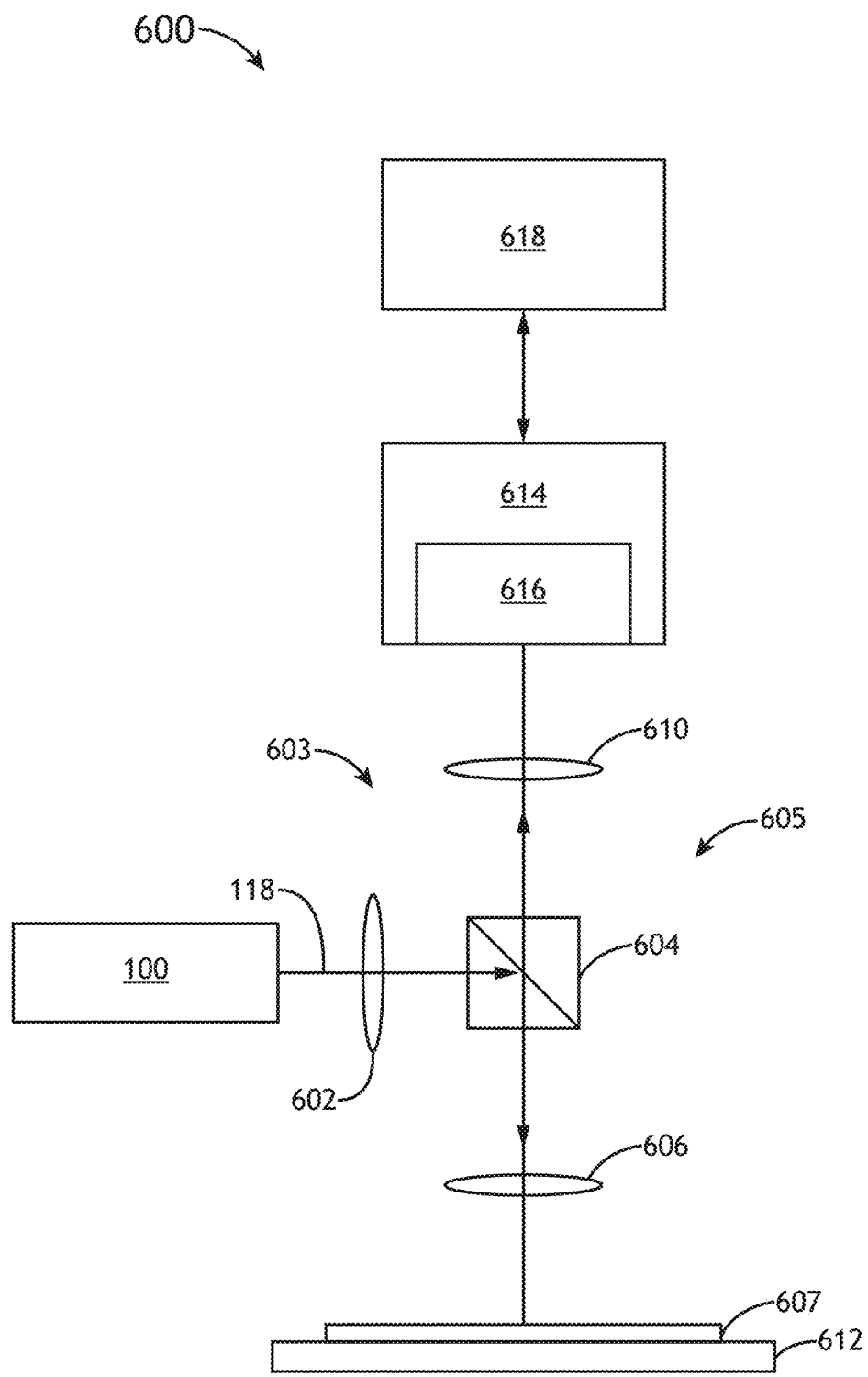
FIG. 6 illustrates a simplified schematic view of an optical characterization system implementing the pulse-assisted LSP broadband light source, in accordance with one or more embodiments of the present disclosure.

FIG. 6 illustrates a simplified schematic view of an optical characterization system 300 implementing the LSP broadband light source 100, in accordance with one or more embodiments of the present disclosure. In embodiments, system 300 includes the LSP light source 100, an illumination arm 603, a collection arm 605, a detector assembly 614, and a controller 618 including one or more processors and memory.

It is noted herein that system 600 may comprise any imaging, inspection, metrology, lithography, or other characterization system known in the art. In this regard, system 600 may be configured to perform inspection, optical metrology, lithography, and/or any form of imaging on a sample 607. Sample 607 may include any sample known in the art including, but not limited to, a semiconductor wafer, a reticle, a photomask, a flat panel display and the like. It is noted that system 600 may incorporate one or more of the various embodiments of the LSP light source 100 described throughout the present disclosure.

In embodiments, sample 607 is disposed on a stage assembly 612 to facilitate movement of sample 607. Stage assembly 612 may include any stage assembly 612 known in the art including, but not limited to, an X-Y stage, an R-θ stage, and the like. In embodiments, stage assembly 612 is capable of adjusting the height of sample 607 during inspection or imaging to maintain focus on sample 607.

In embodiments, the illumination arm 603 is configured to direct broadband light 118 from the broadband LSP light source 100 to the sample 607. The illumination arm 603 may include any number and type of optical components known in the art. In one embodiment, the illumination arm 603 includes one or more optical elements 602, a beam splitter 604, and an objective lens 606. In this regard, illumination arm 603 may be configured to focus broadband light 118 from the broadband LSP light source 100 onto the surface of the sample 607. The one or more optical elements 602 may include any optical element or combination of optical elements known in the art including, but not limited to, one or more mirrors, one or more lenses, one or more polarizers, one or more gratings, one or more filters, one or more beam splitters, and the like.

In embodiments, system 600 includes a collection arm 605 configured to collect light reflected, scattered, diffracted, and/or emitted from sample 607. In another embodiment, collection arm 605 may direct and/or focus the light from the sample 607 to a sensor 616 of a detector assembly 614. It is noted that sensor 616 and detector assembly 614 may include any sensor and detector assembly known in the art. The sensor 616 may include, but is not limited to, a CCD sensor or a CCD-TDI sensor. Further, sensor 616 may include, but is not limited to, a line sensor or an electron-bombardment line sensor.

In embodiments, detector assembly 614 is communicatively coupled to a controller 618 including one or more processors and memory. For example, the one or more processors may be communicatively coupled to memory, wherein the one or more processors are configured to execute a set of program instructions stored on memory. In embodiments, the one or more processors are configured to analyze the output of detector assembly 614. In embodiments, the set of program instructions are configured to cause the one or more processors to analyze one or more characteristics of sample 607. In embodiments, the set of program instructions are configured to cause the one or more processors to modify one or more characteristics of system 600 in order to maintain focus on the sample 607 and/or the sensor 616. For example, the one or more processors may be configured to adjust the objective lens 606 or one or more optical elements 602 in order to focus broadband light 118 from broadband LSP light source 100 onto the surface of the sample 607. By way of another example, the one or more processors may be configured to adjust the objective lens 606 and/or one or more optical elements 610 in order to collect illumination from the surface of the sample 607 and focus the collected illumination on the sensor 616.

It is noted that the system 600 may be configured in any optical configuration known in the art including, but not limited to, a dark-field configuration, a bright-field orientation, and the like. The system 600 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

Additional details of various embodiments of optical characterization system 300 are described in U.S. Published U.S. Pat. No. 7,957,066B2, entitled "Split Field Inspection System Using Small Catadioptric Objectives," issued on Jun. 7, 2011; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imaging," issued on Apr. 28, 2009; U.S. Published Patent Application 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," by Rosencwaig et al., issued on Oct. 2, 2001, which are each incorporated herein by reference in their entirety.

Figure 7:
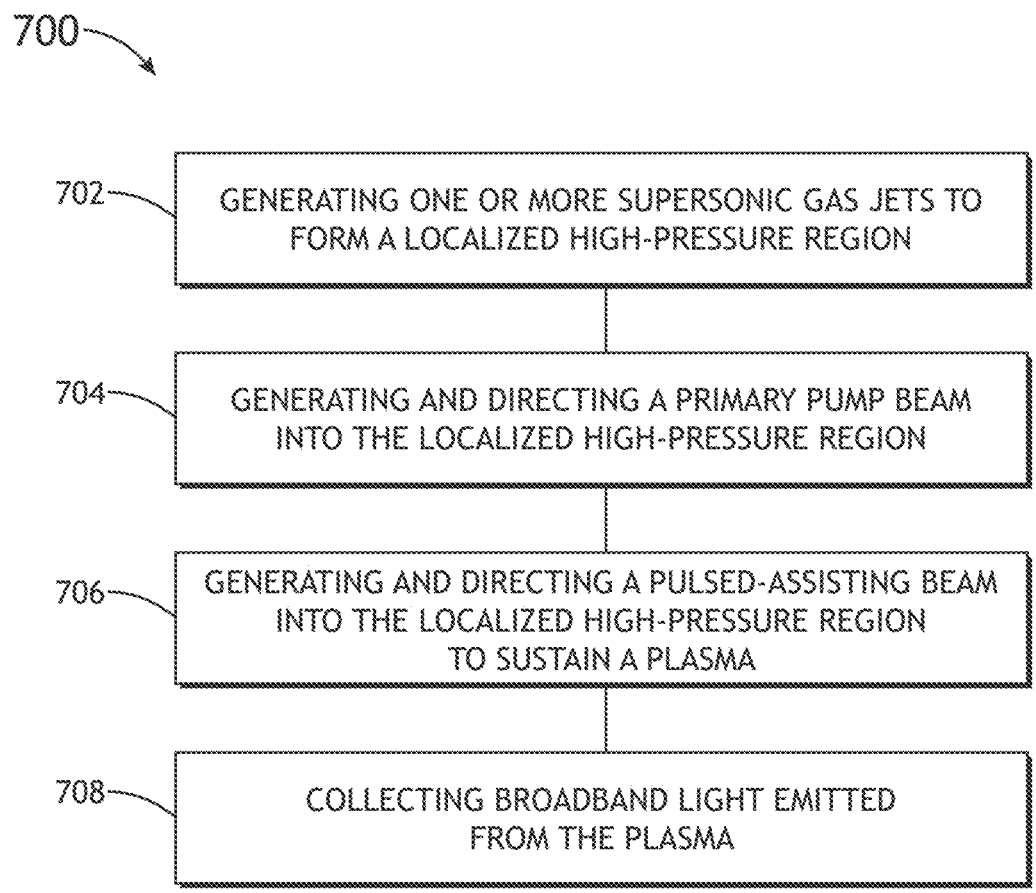
FIG. 7 illustrates a flow diagram depicting a method of generating broadband light, in accordance with one or more embodiments of the present disclosure.

FIG. 7 illustrates a flow diagram depicting a method 700 for generating broadband light 118, in accordance with one or more embodiments of the present disclosure. It is noted herein that the steps of method 700 may be implemented all or in part by broadband LSP light source 100. It is further recognized, however, that the method 700 is not limited to the broadband LSP light source 100 in that additional or alternative system-level embodiments may carry out all or part of the steps of method 700.

In step 702, method 700 includes generating one or more supersonic gas jets to form a localized high-pressure region. In step 704, method 700 includes generating a primary pump beam and directing the primary pump beam into the localized high-pressure region formed by the one or more supersonic gas jets. In step 706, method 700 includes generating a pulsed assisting beam and directing the pulsed-assisting beam into the localized high-pressure region formed by the one or more supersonic gas jets, wherein the primary pump beam and the pulsed-assisting beam sustain a plasma within the localized high-pressure region. In step 708, method 700 includes collecting at least a portion of broadband light emitted from the plasma One skilled in the art will recognize that the herein described components, operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

The invention claimed is:

1. A broadband light source comprising:
a gas containment structure;
a plurality of jet nozzles, wherein the plurality of jet nozzles are configured to generate a plurality of supersonic gas jets and direct the plurality of supersonic gas jets to collide within the gas containment structure to form a localized high-pressure region at a collision point of the plurality of supersonic gas jets;
a primary laser pump source, wherein the primary laser pump source is configured to direct a primary pump beam to a localized high-pressure region formed at a collision point of the plurality of supersonic gas jets;
a pulsed-assisting laser source, wherein the pulsed-assisting laser source is configured to direct a pulsed-assisting laser beam to the localized high-pressure region at the collision point of the plurality of supersonic gas jets,
wherein the primary pump beam and the pulsed-assisting laser beam are configured to sustain a plasma within the localized high-pressure region; and
a light collector element configured to collect at least a portion of broadband light emitted from the plasma.

2. The broadband light source of claim 1, wherein one or more of the plurality of jet nozzles comprise: at least one of a convergent-divergent nozzle, a cylindrical nozzle, or a convergent nozzle.

3. The broadband light source of claim 1, wherein a shockwave is generated at the collision point of the plurality of supersonic gas jets.

4. The broadband light source of claim 3, wherein the shockwave comprises a diamond shockwave.

5. The broadband light source of claim 1, wherein the localized high-pressure region has a pressure greater than a pressure of an ambient pressure region within the gas containment structure.

6. The broadband light source of claim 1, wherein the light collector element comprises an elliptical reflector.

7. The broadband light source of claim 6, wherein the pulsed-assisting laser beam is directed to the collision point of the plurality of supersonic gas jets through an aperture within a wall of the elliptical reflector.

8. The broadband light source of claim 1, wherein the primary laser pump source comprises a continuous-wave (CW) laser source.

9. The broadband light source of claim 1, wherein the pulsed-assisting laser source comprises a pulsed laser.

10. The broadband light source of claim 1, wherein one or more of the plurality of supersonic gas jets comprise a gas jet of one or more noble gases.

11. The broadband light source of claim 10, wherein the one or more noble gases comprises at least one of xenon, argon, neon, or helium.

12. The broadband light source of claim 1, wherein one or more of the plurality of supersonic gas jets comprise a gas jet including a mixture of two or more gases.

13. The broadband light source of claim 1, further comprising primary pump focusing optics configured to focus the primary pump beam into the localized high-pressure region.

14. The broadband light source of claim 1, further comprising pulsed-assisting laser focusing optics configured to focus the pulsed-assisting laser beam into the localized high-pressure region.

15. The broadband light source of claim 1, further comprising:
a recirculation loop configured to circulate gas through the gas containment structure, wherein the recirculation loop provides gas to the plurality of jet nozzles.

16. The broadband light source of claim 15, wherein the recirculation loop includes one or more gas pumps, one or more heat exchangers, or one or more filters.

17. A broadband light source comprising:
a gas containment structure;
one or more jet nozzles, wherein the one or more jet nozzles are configured to generate one or more supersonic gas jets;
a primary laser pump source, wherein the primary laser pump source is configured to direct a primary pump beam to a localized high-pressure region formed by a supersonic gas expansion of the one or more supersonic gas jets;
a pulsed-assisting laser source, wherein the pulsed-assisting laser source is configured to direct a pulsed-assisting beam to the localized high-pressure region formed by the supersonic gas expansion of the one or more supersonic gas jets,
wherein the primary pump beam and the pulsed-assisting beam are configured to sustain a plasma within the localized high-pressure region; and
a light collector element configured to collect at least a portion of broadband light emitted from the plasma.

18. The broadband light source of claim 17, wherein the localized high-pressure region is formed at a Mach disk of the supersonic gas expansion.

19. A system comprising:
a broadband source comprising:
a gas containment structure;
a plurality of jet nozzles, wherein the plurality of jet nozzles are configured to generate a plurality of supersonic gas jets and direct the plurality of supersonic gas jets to collide within the gas containment structure to form a localized high-pressure region at a collision point of the plurality of supersonic gas jets;
a primary laser pump source, wherein the primary laser pump source is configured to direct a primary pump beam to a localized high-pressure region formed at a collision point of the plurality of supersonic gas jets;
a pulsed-assisting laser source, wherein the pulsed-assisting laser source is configured to direct a pulsed-assisting beam to the localized high-pressure region at the collision point of the plurality of supersonic gas jets,
wherein the primary pump beam and the pulsed-assisting beam are configured to sustain a plasma within the localized high-pressure region; and
a light collector element configured to collect at least a portion of broadband light emitted from the plasma;
a set of illuminator optics configured to direct the broadband light from the light collector element to one or more samples;
a detector assembly; and
a set of projection optics configured to receive illumination from a surface of the one or more samples and direct the illumination from the one or more samples to the detector assembly.

20. A system comprising:

a broadband source comprising:

a gas containment structure;

one or more jet nozzles, wherein the one or more jet nozzles are configured to generate one or more supersonic gas jets;

a primary laser pump source, wherein the primary laser pump source is configured to direct a primary pump beam to a localized high-pressure region formed by a supersonic gas expansion of the one or more supersonic gas jets;

a pulsed-assisting laser source, wherein the pulsed-assisting laser source is configured to direct a pulsed-assisting beam to the localized high-pressure region formed by the supersonic gas expansion of the one or more supersonic gas jets, wherein the primary pump beam and the pulsed-assisting beam are configured to sustain a plasma within the localized high-pressure region; and a light collector element configured to collect at least a portion of broadband light emitted from the plasma;

a set of illuminator optics configured to direct the broadband light from the light collector element to one or more samples;

a detector assembly; and a set of projection optics configured to receive illumination from a surface of the one or more samples and direct the illumination from the one or more samples to the detector assembly.

21. A method comprising:

generating one or more supersonic gas jets to form a localized high-pressure region;

generating a primary pump beam and directing the primary pump beam into the localized high-pressure region formed by the one or more supersonic gas jets;

generating a pulsed-assisting beam and directing the pulsed-assisting beam into the localized high-pressure region formed by the one or more supersonic gas jets, wherein the primary pump beam and the pulsed-assisting beam sustain a plasma within the localized high-pressure region; and collecting at least a portion of broadband light emitted from the plasma.

\* \* \* \* \*